March 22, 1960

C. L. GOSS 2,929,274

HYDRAULIC CONTROL SYSTEM

Filed Oct. 14, 1955

2 Sheets-Sheet 1

INVENTOR.
CHARLES L. GOSS
BY

AGENT

March 22, 1960 C. L. GOSS 2,929,274
HYDRAULIC CONTROL SYSTEM
Filed Oct. 14, 1955 2 Sheets-Sheet 2

INVENTOR.
CHARLES L. GOSS
BY
AGENT

United States Patent Office 2,929,274
Patented Mar. 22, 1960

2,929,274

HYDRAULIC CONTROL SYSTEM

Charles L. Goss, Sidney, Ohio, assignor to The Monarch Machine Tool Company, Sidney, Ohio, a corporation of Ohio Application October 14, 1955, Serial No. 540,489

4 Claims. (Cl. 74—824)

This invention relates to a hydraulic control system for operating and controlling the turret and its locator pin and clamp on a conventional type of turret lathe. This turret control system is adapted to be used in any situation where turret indexing, locating and clamping is of importance, and therefore this disclosure will refer primarily to the turret control system with only so much reference to the remainder of the machine as is necessary to properly orient the invention.

This hydraulic control system is adapted to control turrets whether they are used opposing a headstock on a turret lathe, whether they are used on a cross slide, whether they are used in a vertical application such as a boring mill or a drill press, or whether they are used to carry various dies in a punch press. Turrets as such are known in the machine tool art, but in many constructions it is necessary to index the turret by means of manual power. In other constructions the turret is indexed by means of power from the main drive motor by means of an indexing cam or a power shaft from the headstock. The instant invention provides an improvement thereover by providing a unitary system which indexes, locates and clamps the turret and provides the proper interlocks so that these functions are carried out at the appropriate time and in the proper sequence.

Accordingly, it is an object of this invention to provide a hydraulic control system for turrets used on machine tools.

It is a further object of this invention to provide a hydraulic control system for turrets which provides indexing, locating and clamping means for the turret.

It is a further object of this invention to provide a control system wherein interlocks are provided so that the various functions are completed at the appropriate time and in the proper sequence.

It is another object of this invention to provide signal means within the hydraulic circuit to initiate indexing at the correct time.

Figure 1:
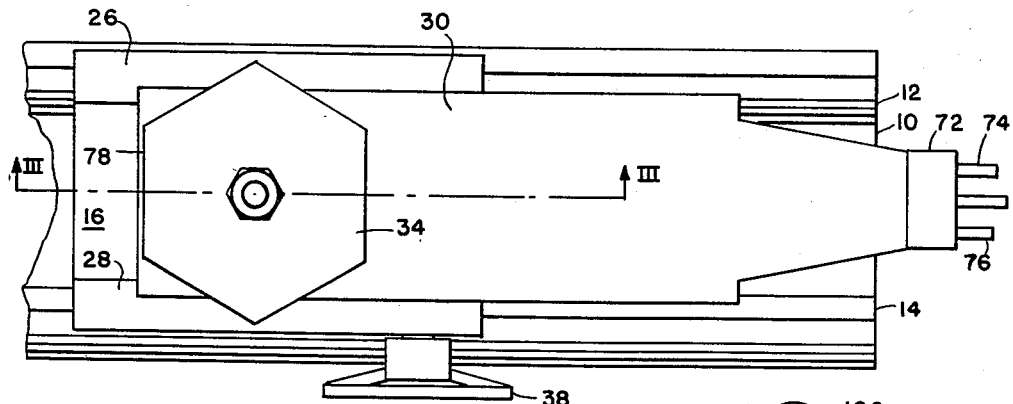
Figure 2:
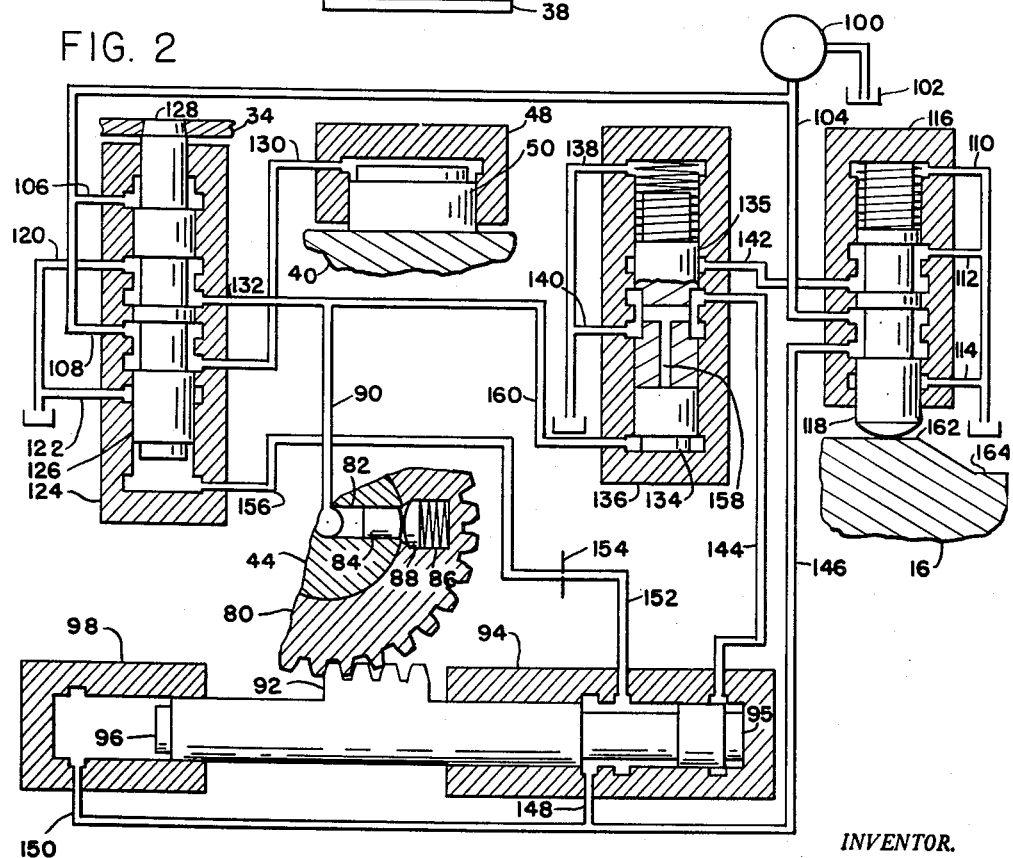
Figure 3:
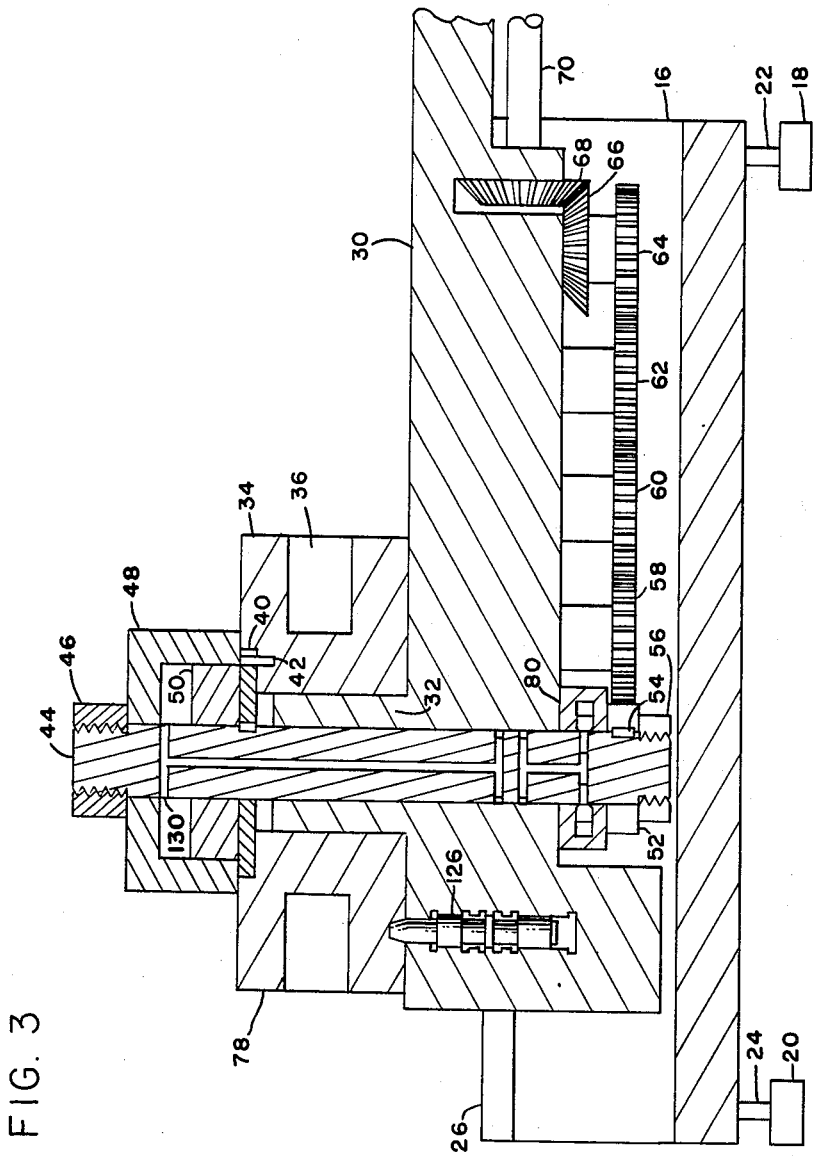

Other objects and advantages of this invention will be discerned from the following specification and the attached drawings in which:

Figure 1 is a plan view of a turret having a hydraulic control system as described hereinafter, Figure 2 is a schematic hydraulic circuit of the control system of the instant invention, and Figure 3 is a partial sectional view through the turret and its associated mechanism taken on the line III—III of Figure 1.

Referring now to Figures 1 and 3, a machine tool bed is shown at 10. This bed has a rear V 12 and a front flat 14 upon which is mounted a turret base 16. The turret base 16 is normally clamped down to the bed by means of clamp bars 18 and 20 and bolts 22 and 24 so that the turret base 16 is mounted relatively immovably upon the bed 10. Guide bars 26 and 28 serve as way guide surfaces for a slidable turret carrier 30. Mounted upon a bearing 32 extending upwardly and integral with the turret carrier 30 is a turret 34 having openings 36 adapted to provide for the proper location of tools to be mounted on the turret 34. The turret carrier 30 is movable along the guide bars 26 and 28 by means of a handwheel 38 which drives an appropriate pinion engaged with a rack on the turret carrier 30 so that relatively linear motion is accomplished. Of course, the turret carrier 30 may be moved along the base 16 by any of the conventional power feed means.

Turret 34 is revolubly mounted upon the bearing 32 and is rotated thereon by being secured relatively to disc 40 which is pinned to the turret 34 by means of pin 42. The disc 40 is driven by shaft 44 by means of a key as shown in the drawing or it may be mounted thereon with a drive through splines or other positive means. Around the shaft 44 and clamped down to the turret 34 by means of a nut 46 is a cylinder 48 having a piston 50 therein. This piston engages the top face of disc 40 to force the turret 34 down to clamp it on the top face of the turret carrier 30. The hydraulic connections for operating the clamp piston 50 will be described hereinafter. Also driven by shaft 44 is a gear 52 which is keyed by key 54 to shaft 44 and is held thereon by means of a nut 56. A plurality of idlers 58, 60, 62 and 64 are arranged to drive a bevel gear 66 which in turn drives bevel gear 68 which turns shaft 70. Inasmuch as shaft 70 is connected to turret 34 by means of a chain of gearing and shaft 44, its position is directly related to the position of the turret 34. Mounted on the back of the end of shaft 70 is an indexing stop carrier 72 which carries stops 74 and 76 as well as others each related to a particular turret face. If the turret has six faces, as shown, one of which is face 78, there would normally be six adjustable stops of which 74 and 76 are examples. Each of these stop bars can be adjusted to provide the correct depth of cut of the tool associated with each turret face.

Also surrounding shaft 44 is a gear 80 which is more readily seen in Figure 2. Shaft 44 is provided with a bore 82 in which is located a plunger 84 which is adapted to be extended outwardly into a bore 86 in gear 80. In the bore 86 is a plunger 88 which is spring urged toward the shaft 44 so that the plunger 84 is retracted unless there is hydraulic pressure in line 90 sufficient to overcome the force of the spring. When plunger 84 is extended it locks the gear 80 to the shaft 44 so that the gear 80 can turn shaft 44 and thereby turn the turret 34 relative to the turret carrying slide 30. Since the bore 86 and its plunger 88 are larger in diameter than bore 52, the plunger 88 is prevented from becoming a driving member by engaging in bore 82, but plunger 88 only serves to keep plunger 84 retracted when it is not extended by hydraulic pressure.

Engaging the gear 80 is a rack 92 which is operated in an indexing direction by means of a piston 95 located in cylinder 94 and in the re-set direction by means of a piston 96 located in cylinder 98.

A pump 100 which takes fluid from a sump 102 is provided to discharge hydraulic fluid under pressure to lines 104, 106 and 108. Lines 110, 112 and 114 are connected to sump 102 from turret index valve body 116 containing spool 118 and lines 120 and 122 are connected to the sump 102 from turret locating valve body 124 containing valve spool 126. The valve spool 126 carries a locating pin 128 for locating the turret 34 in its correct position. Connected to valve body 124 is a line 130 which supplies fluid at the correct times to depress clamp piston 50 for locking the turret 34 to the turret carrier 30. A line 132 is connected to valve body 124 and line 132 is connected to line 90 as well as the space below valve spools 134 and 135 in index pilot valve body 136. These spools are urged downwardly by means of the spring shown in the top of valve body 136. Valve body 136 has lines 138 and 140 connected to the sump 102 and has line 142 connected to valve body 116. Valve body 136 has a line 144 connected thereto and to the end of cylinder 94 adjacent to piston 95 which causes the gear 80 to move in a direction which indexes the turret 34. Valve body 116 has a line 146 which is connected to line 148 in cylinder 94 and line 150 connected to cylinder 98. Cylinder 94 has a line 152 which is connected through an orifice 154 to line 156 which is connected to bottom of valve body 124 below the spool 126.

The two spools 134 and 135 are provided in valve body 136 so that pressure in inner drilling 158 in spool 135 causes spool 135 to remain in an upper position despite draining line 160 which is connected to the bottom of valve block 136 as well as to line 132. Valve spool 118 is urged downwardly in the drawing by means of a spring and is held upwardly by means of a cam having a high portion 162 and a lower portion 164 secured to the base 16. The spool 118 is shown in the position it assumes when the turret carrier 30 is advanced toward the work away from its full retracted position.

*Method of operation*

In the condition shown in Figure 2 the turret is ready for another cutting operation. The pump 100 discharges fluid under pressure through line 104 to line 146 and this line is connected to line 150 which causes the piston 96 to be held to the right and thereby hold the gear 80 in a position shown by means of rack 92. Line 146 is also connected to line 148 and thence to line 152 through orifice 154 to line 156 thereby holding spool 126 in the upper position to cause locating pin 128 to properly locate the turret. The bottom area of the spool 126 is larger than the area acted upon by the pressure from line 106 and since the pressures are approximately equal the spool is urged upwardly. In the upward position of spool 126 pressure line 108 is connected to line 130 to urge clamp piston 50 downwardly to cause clamping. In the same position line 120 to drain is connected to line 132 which in turn is connected to both lines 90 and 160 to respectively cause the retraction of plunger 84 and the dropping of spool 134. Since there is no pressure in inner drilling 158 spool 135 is held in the downward position by its spring. The operator advances the turret 34 by turning the handwheel 38 until its appropriate stop mounted in stop drum 72 signals the correct depth of cut. Then the operator retracts the turret carrier 30 and turret 34 by manual turning of handwheel 38. It is understood that well-known feeds and traverses may be used instead to advance and retract the turret carrier 30.

When the turret carrier 30 is fully retracted the spool 118 moves from the upper position 162 of the cam to the lower portion 164. Thereupon line 104 is connected to line 142 to apply pump pressure thereon and line 146 is connected to drain 114. Pressure in line 106 urges spool 126 downwardly exhausting the fluid from below the spool through line 156, orifice 154, line 152, line 148, line 146, and thence to drain through line 114. When the spool 126 is in its lower position line 130 is connected to drain through line 122 thereby disengaging the clamp piston 50 and pressure line 108 is connected to line 132 and thence through line 90 to bore 82 thereby extending plunger 84 which causes locking of the gear 80 to the shaft 44. Pressure in line 132 is transmitted to line 160 which moves both spools 134 and 135 to their upper positions to connect line 142, which now contains fluid under pressure from line 104, to line 144. Pressure in line 144 acts upon the end of piston 95 to move pistons 95, 96, and rack 92 to the left to cause indexing of the turret. When the piston 95 reaches its left-most position, line 144 is opened to line 152 and fluid under pressure flows therethrough, through orifice 154 and line 156 to raise spool 126 to cause the locating portion 128 to correctly locate the turret. Thereupon pressure line 108 is again connected to the turret clamp line 130 to cause clamping of the turret, and lines 90 and 160 are connected to drain 120 to cause retraction of plunger 84 and remove the pressure from beneath plunger 134. Inasmuch as pressure from line 142 communicates with the inner drilling 158, the valve spool 135 is held in its upward position and the hydraulic system remains in this condition until the turret is again advanced.

When the turret is again advanced to raise the spool 118 to the position shown, line 142 is connected to drain line 112 to permit the descent of spool 135, and pressure line 104 is connected through line 146 to line 150 to permit the piston 96 to freely move the gear 80 back to the position shown. At this time line 144 is connected to drain through line 140. The orifice 154 is provided to prevent draining of line 156 until the piston 96 has moved sufficiently far to the right to reconnect line 152 to pressure which is now supplied by line 148. The system is again in the position shown and is ready to permit the operator to present another tool to the workpiece.

This cycle is repeated continually with only initiation by the operator as he selects a new turret face. It is seen that the turret need not be fully advanced to the work to cause indexing, so the operator is able to index past several turret faces as the tooling might require by only small motion of the handwheel 38.

While this invention has been described in its preferred form it is obvious that many modifications may be made therein within the scope of the invention. It is therefore desired that the scope of the invention be defined in the appended claims.

What I claim is:

1. In a control system for a rotatable turret, a source of fluid under pressure, a fluid motor movable from a first to a second position to rotate said turret, a turret indexing valve having index signalling and nonsignalling positions, means to move said turret indexing valve from nonsignalling to signalling position and to return it from signalling to nonsignalling position, an index pilot valve having first and second positions, fluid power means to move said index pilot valve from said first to said second position and means to move said index pilot valve from said second to said first position, and a turret locating valve having locating and released positions, fluid power means to move said turret locating valve from locating to released position and from released to locating position, said valves being arranged to control said fluid under pressure to cause said motor to index said turret to a predetermined position; said turret index valve being connected to said supply of fluid under pressure and to said turret locating valve in such a manner that when said turret indexing valve is moved to signalling position, said turret locating valve is mounted to released position; clutch means between said motor and said turret, said turret locating valve being connected to said clutch means and to said index pilot valve in such a manner that release of said locating valve engages said clutch means and moves said index pilot valve to its second position, said index pilot valve being connected to said source of fluid under pressure and to said motor so that movement of said index pilot valve to its second position permits fluid under pressure to move said motor from its first to its second position and through said engaged clutch to index said turret.

2. The system of claim 1 wherein said motor is connected to said locating valve by connections causing said locating valve to locate said turret after said motor has indexed said turret a predetermined amount.

3. The system of claim 2 wherein said locating valve is connected so that motion thereof to locating position causes return of said index pilot valve from its second to its first position and disengages said turret indexing clutch.

4. In a control system for a rotatable turret, a source of fluid under pressure, a fluid motor movable from a first to a second position to rotate said turret, a turret indexing valve having index signalling and nonsignalling positons, means to move said turret indexing valve from nonsignalling to signalling position and to return it from signalling to nonsignalling position, an index pilot valve having first and second positions, fluid power means to move said index pilot valve from said first to said second position and means to move said index pilot valve from said second to said first position, and a turret locating valve having locating and released positions, fluid power means to move said turret locating valve from locating to released position and from released to locating position, said valves being arranged to control said fluid under pressure to cause said motor to index said turret to a predetermined position; said turret index valve being connected to said supply of fluid under pressure and to said turret locating valve in such a manner that when said turret indexing valve is moved to signalling position, said turret locating valve is moved to released position; clutch means between said motor and said turret, said turret locating valve being connected to said clutch means and to said index pilot valve in such a manner that release of said locating valve engages said clutch means and moves said index pilot valve to its second position, said index pilot valve being connected to said source of fluid under pressure and to said motor so that movement of said index pilot valve to its second position permits fluid under pressure to move said motor from its first to its second position and through said engaged clutch to index said turret, said motor being connected to said locating valve by connections causing said locating valve to locate said turret after said motor has indexed said turret a predetermined amount; said locating valve being connected so that motion thereof to locating position causes return of said index pilot valve from its second to its first position and disengages said turret indexing clutch; and return of said indexing valve from said turret indexing signalling position to its nonsignalling position connects fluid under pressure to said motor to return it to its first position.

References Cited in the file of this patent

UNITED STATES PATENTS

| | | |
|---|---|---|
| 912,124 | Hanson | Feb. 9, 1909 |
| 1,148,998 | Sears | Aug. 3, 1915 |
| 1,924,594 | Blood et al. | Aug. 29, 1933 |
| 1,934,358 | Kylin | Nov. 7, 1933 |
| 2,286,585 | Simpson | June 16, 1942 |
| 2,291,382 | Duglin | July 28, 1942 |
| 2,360,710 | Nutt et al. | Oct. 17, 1944 |
| 2,417,366 | Kylin et al. | Mar. 11, 1947 |
| 2,549,746 | Kylin et al. | Apr. 17, 1951 |